March 13, 1934.    M. FLAHERTY    1,951,188

DETACHABLE SHAFT COUPLING DEVICE

Filed March 26, 1931

INVENTOR.
Mark Flaherty,
BY J R Goldsborough
HIS ATTORNEY.

Patented Mar. 13, 1934

1,951,188

UNITED STATES PATENT OFFICE 1,951,188

DETACHABLE SHAFT COUPLING DEVICE

Mark Flaherty, Haddon Heights, N. J., assignor, by mesne assignments, to Radio Corporation of America, New York, N. Y., a corporation of Delaware Application March 26, 1931, Serial No. 525,421

10 Claims. (Cl. 287—53)

The present invention relates to control knobs, operating handles and the like, for instrument control shafts. More particularly, the present invention relates to means for detachably securing control elements of the above character to instrument control shafts.

It is a common practice to use set screws for the purpose of securing knobs and other control elements to instrument control shafts, although there are several recognized disadvantages inherent in this practice. For example, among other things, a set screw requires an opening which impairs the finished appearance of the control element; it is liable to become loosened in use, and it is relatively costly in manufacture and assembly with other apparatus.

In view of these and other disadvantages, various expedients have, heretofore, been proposed to eliminate set screws as means for securing knobs and other control handles to instrument shafts, but in many instances not without further disadvantages arising from an increase in the size of the holding means, and with equal or greater cost of manufacture.

It is, therefore, an object of the present invention to provide an improved shaft coupling device and improved means for detachably securing control knobs and like control elements to instrument control shafts, which means is adapted readily to be secured to such shafts without the use of set screws or similar holding means, and which is of simple construction, whereby it is adapted for manufacture at low cost.

The invention will better be understood from the following description when taken in connection with the accompanying drawing, and its scope will be pointed out in the appended claims.

Figure 1:
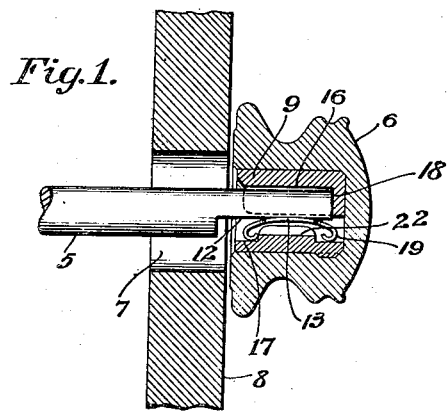
Figure 4:
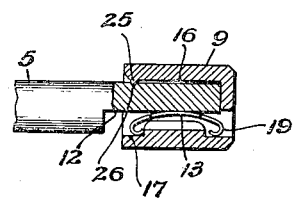
Figure 2:
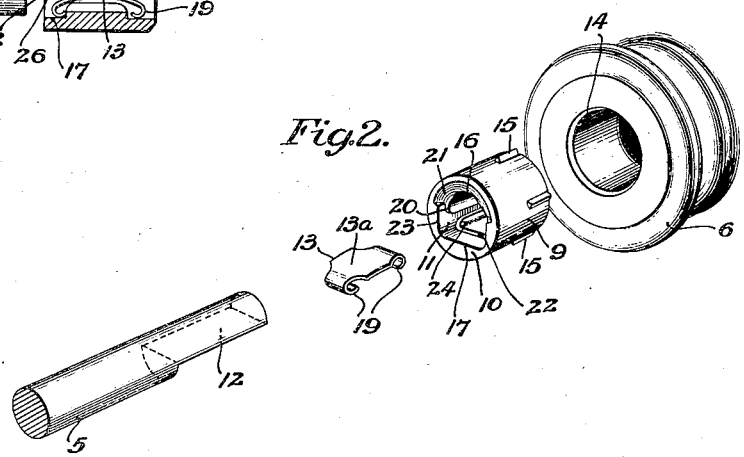
Figure 3:
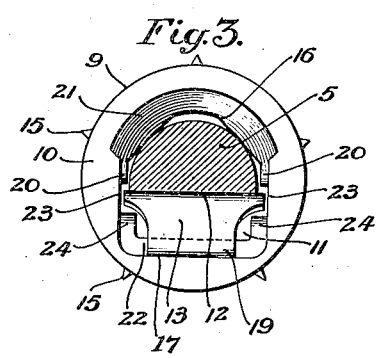

In the drawing, Fig. 1 is an enlarged side view, in cross section, of a shaft coupling device embodying the invention as applied to a panel knob in connection with an instrument control shaft; Fig. 2 is an exploded view in perspective, on the same scale, of the embodiment of the invention shown in Fig. 1; Fig. 3 is an end view, partly in section and on a greatly enlarged scale, of the coupling device of Figs. 1 and 2, assembled on the shaft and showing further details of construction, and Fig. 4 is a side view in section showing a modification.

Referring to Figs. 1, 2 and 3 of the drawing in which, throughout the several figures, the same reference numerals indicate like parts, 5 is an instrument control shaft representing any shaft member to which it is desired directly to connect a suitable control member such as a panel or control knob 6. In the present example the shaft is arranged to project through an opening 7 in an instrument panel 8 a sufficient distance as indicated in Fig. 1 to receive a connection with the knob which is mounted on the front face of the panel.

Interposed between the two members and providing a detachable connection with the shaft is a coupling device embodying the invention and including a body 9 having an end surface or face 10 in which is provided an open elongated cavity or socket 11 adapted to receive and seat upon the shaft end. The shaft end is flattened or provided with an axially extending flat side or surface 12 which is engaged by a spring key member 13 located in the socket.

The coupling device of the prevent invention may be regarded as having a body of any suitable size and shape demanded by its use as an operating or controlling member for direct connection with a shaft. In the present example the body of the coupling device is an elongated cylindrical member or shell adapted to be inserted in a central axially extending cavity 14 in the knob, as a hub member therefor, and to be secured therein by suitable means such as peripheral burrs or projections 15 which cut into and become embedded in the material of the knob when pressed into the cavity. With certain mouldable materials, the body may be located in the knob and the projections embedded therein when the knob is moulded.

The hub member or body 9 thus forms a part of the knob, control member or other means with which the shaft is to be detachably connected. It is obvious, therefore, that the body of the coupling device may be of any desired shape and size and may, if desired, be formed to provide an integral part of the control element, such, for example, as the body of the knob itself.

The cavity or socket 11 is slightly larger in cross section than the diameter of the shaft and is provided with two spaced opposed walls 16 and 17 which, for convenience of reference, may be termed the top and bottom walls, respectively. One of the walls, such as the top wall 16, is adapted to seat upon a surface of the shaft to hold the knob in axial alignment therewith. An inner end wall 18 serves as a stop means for the shaft end when the device is fully seated upon the shaft to prevent the knob from contacting with the instrument panel and transmitting vibrational forces therefrom to the shaft.

The key member 13 is formed from a flat strip of spring material bent into concave-convex form substantially as indicated in Fig. 2, whereby it is provided with a central bowed portion 13a adapted to engage the flat surface 12 of the shaft 5. The ends 19 of the spring are free and in the present example are curled, whereby they are adapted to engage and ride upon the wall 17 of the cavity opposed to the wall 16 which engages the shaft.

The spring or key member 13 is slightly narrower between its lateral edges than the width of the socket and is reduced in width at its ends, whereby it may easily be inserted or removed from the socket. When located in the socket in the position indicated in Fig. 1, it is retained in an operative position in readiness to engage the shaft when inserted in the socket by a pair of axially extending shoulders 20.

The spring is bowed initially to such an extent that normally it engages the shoulders 20 when it is located in the socket but is relieved from contact with the shoulders and slightly flattened by the introduction of the shaft. It will be noted that the spring is only slightly bowed, whereby it offers slight resistance to the introduction of the shaft. In order to facilitate the entry of the shaft, the frontal opening of the socket adjacent the wall 16 is beveled outwardly as indicated at 21.

The key member or spring 13 is retained in the cavity or socket against the action of the shaft which would normally tend to withdraw it when the shaft is withdrawn, by means carried by the wall 17, in the form of a lug or bar 22 extending between the side walls 23 of the cavity and along the wall 17 substantially midway of the length of the socket or cavity, whereby the lug or bar lies between the ends of the spring as a projection from the wall 17 in a position to engage them when the spring is moved axially of the socket.

The spring may be inserted in or removed from the socket by forcing it over the bar 22. When removing the spring, the inner end is lifted over the bar while the body of the spring is drawn forward through the outer opening of the cavity in contact with the shoulders 20.

Referring particularly to Fig. 3, it will be noted that in addition to the shoulders 20 in the side walls 23, which hold the key member in operative relation to the shaft before the latter is inserted in the socket, there are also provided two shoulders 24 which are located on the opposite side of the key member or spring from the first named shoulders and the shaft. These shoulders are so arranged that they provide stop means for the key member whereby it is prevented from being deformed should a force be applied to the body of the coupling device or to the shaft sufficient to overcome the holding force of the spring and permit relative rotational or extreme canting movement of the shaft and body. It will be seen that the shoulders or stop means 24 limit such movement, and are located a distance above the wall 17 or are so spaced on walls 23 from shoulders 20 that the spring member 13 is prevented from being deformed beyond a safe limit.

From the foregoing description, it will be seen that the shaft coupling means of the present invention includes a simple body member having an axially extending cavity therein provided with a surface or wall adapted to engage a shaft surface and is prevented from turning on the shaft by a spring key member which is adapted to engage a flattened surface on the shaft end.

By suitable means provided within the cavity or socket, the key member is guided into position and retained in operative relation to the shaft whereby it is adapted to engage the shaft when presented therein. Furthermore, by other means provided in the socket, the key member is prevented from being removed with the shaft and is retained in the socket. In addition, stop means are provided in the socket for the shaft end and for the spring key member, whereby excessive relative movement between the shaft and body tending to distort the key member is prevented.

Stated in other words, the shoulders 20 in the side walls of the socket provide means which prevent movement of the spring key member transversely or laterally of the socket in one direction while the shoulders 24 provide means which prevent excessive similar movement of the member in the opposite direction, and the bar or projection 22 provides means for preventing the key member from movement axially of the socket and being withdrawn by frictional contact with the shaft. The shaft coupling device is therefore of simple construction adapted readily to be manufactured at low cost and is easily assembled.

In practice the projections or shoulders and the retaining bar for the key member within the socket, together with the external projections 15, are formed integral with the body of the coupling device, being cast in one piece of suitable metal. The spring is formed as a single punching and the assembly merely involves inserting the spring within the cavity until it becomes locked in place over the bar or locking means 22.

Referring now to Fig. 4, a modification is shown in the construction of the body 9 of the coupling device, in that an additional locking means is provided for the device. This is provided by way of example, by a projection 25 located adjacent the open end of the socket in the surface 16 which engages the shaft surface. A corresponding transverse notch 26 is provided in the surface of the shaft whereby, when the device is seated on the shaft end, the action of the spring key member 13 causes the projection to enter the notch and lock the device upon the shaft. This prevents a direct axial pull from removing the device, or the knob by which it is carried.

The device is placed upon the shaft end slightly canted against the spring action of the key member 13 until the projection 25 registers with the notch 26 and seats therein to lock the device upon the shaft. The device is removed by canting it and pulling it axially from the shaft.

An additional locking means, such as that above described, may be desirable in certain apparatus having live shafts, that is, shafts which are at considerable electric potentials above that of the surrounding apparatus. With the knob additionally locked upon the shaft by suitable means such as that above described, the end of the live shaft is not easily exposed since the knob may not be removed except by canting it in the proper direction and then moving it axially from the shaft. Thus this locking means tends to prevent a careless or accidental contact with a live shaft by removing the knob.

It will be seen that the shaft coupling device of the present invention is adapted to be mounted in and to be concealed by any suitable control member for an instrument shaft, and permits the control member to be mounted on or removed from the shaft without the aid of tools, and when mounted, to be rigidly affixed to the shaft. Thus it avoids the necessity for the use of set screws and similar holding devices and permits the finished appearance of control means to be preserved while providing means for effectively connecting the control means with instrument shafts and the like.

I claim as my invention:

1. An instrument control device including a body having a socket for receiving a shaft end, a shaft retaining means arranged to lie in said socket and including a spring having a bowed central portion for engaging said shaft end and having free ends adapted to slidably engage a wall of said socket, means provided on said wall between the ends of said spring for retaining said spring within the socket, and means for retaining said spring in an operative position to engage said shaft end.

2. The combination with an instrument control shaft and an operating knob for said shaft, of a hub member for detachably securing said knob to said shaft, said member including a body having an axially extending socket therein for receiving the shaft end, said socket having a wall adapted to seat upon the shaft and a second wall arranged in opposite spaced relation thereto, a spring key member of flat spring material located in the socket and having ends slidably engaging said second wall, means for retaining the key member in a position to engage the shaft, means located on said second named wall between the ends of said spring key member for retaining said member in the socket, and locking means for said hub located on said first named wall and adapted to engage the shaft under a biasing action of said spring key member.

3. A detachable shaft coupling device having a socket for receiving the end portion of a shaft, a removable bowed spring member inserted in said socket and extending therein in an axial direction, said socket including a wall adapted to engage and seat upon a surface of the shaft and a second wall spaced from the first named wall providing a bearing for the ends of said spring member, and means located adjacent to said second wall and between the ends of the bowed spring member for limiting axial movement of said member within the socket and for preventing it from accidentally being withdrawn or removed therefrom.

4. A detachable shaft coupling device including in combination, a body having a shaft socket provided by two spaced walls, a spring key member having a bowed center portion and ends slidably seated upon one of said first named walls, means located in said socket between the ends of said key member for retaining said member in the socket and against longitudinal movement therefrom, and stop means located in the socket for limiting the movement of the key member transversely of the socket in a direction away from said retaining means.

5. A detachable shaft coupling device having a shaft socket, a spring key member having a bowed center portion and ends slidably seated upon one of the walls of the socket, a bar located on said wall between the ends of said key member for retaining said member in the socket and against longitudinal movement therefrom, a second and opposite wall of the socket being adapted to engage and lock with a surface of a shaft when the shaft is inserted in the socket, and stop means located in the socket for limiting the movement of the key member transversely of the socket in a direction away from said retaining means.

6. An instrument control device including in combination, a body having a socket adapted to seat upon a shaft end in locking engagement with a surface thereof, a key member located in said socket, said member being in the form of a bowed strip of spring material having free ends adapted to engage one wall of the socket, means located in said socket on one wall thereof between the ends of the spring member for retaining said member in the socket and against longitudinal movement therefrom, and projecting means carried by an opposite wall of the socket for entering a notch in said shaft whereby it may lock with the shaft when inserted in the socket.

7. An instrument control device including in combination, a body having a socket adapted to seat upon a shaft end in engagement with a surface thereof, a key member located in said socket, said member being in the form of a bowed strip of spring material having curled ends adapted to lie in slidable engagement with one wall of the socket, and projecting means located on said wall between the ends of the spring member for retaining said member in the socket and against longitudinal movement therefrom.

8. A detachable shaft coupling device having a socket for receiving a shaft end, a bowed spring member located in said socket, and a stop bar for preventing accidental withdrawal of the spring member from the socket located on one wall of said socket between and in a position to engage the ends of said spring member.

9. A detachable shaft coupling device having a socket for receiving a shaft end, a bowed spring member located in said socket, a stop bar for preventing accidental withdrawal of the spring member from the socket located on one wall of said socket and between the ends of said spring member, and a projection carried by an opposite wall of the socket for locking engagement with a shaft surface adapted to receive it.

10. In combination, a shaft, a knob having a recess into which one end of said shaft is inserted, resilient means interposed between a wall of the recess and the shaft for retaining said shaft and knob in semi-fixed relation, and means for retaining said resilient means within said recess upon withdrawal of said shaft, the first named resilient retaining means being bowed between its ends, and the second named retaining means being associated with a wall of the socket with which wall said ends contact and being located between said ends of the first named retaining means.

MARK FLAHERTY.